(12) United States Patent
Nishi et al.

(10) Patent No.: US 8,657,269 B2
(45) Date of Patent: Feb. 25, 2014

(54) VIBRATION DAMPING DEVICE

(75) Inventors: Naoki Nishi, Nagoya (JP); Yasunori Isogai, Findlay, OH (US)

(73) Assignee: Tokai Rubber Industries, Ltd., Aichi (JP)

( * ) Notice: Subject to any disclaimer, the term of this patent is extended or adjusted under 35 U.S.C. 154(b) by 90 days.

(21) Appl. No.: 13/336,484

(22) Filed: Dec. 23, 2011

(65) Prior Publication Data

US 2013/0161883 A1    Jun. 27, 2013

(51) Int. Cl.
*F16F 5/00* (2006.01)
*F16M 11/00* (2006.01)

(52) U.S. Cl.
USPC ............... 267/140.12; 267/140.13; 267/141.3

(58) Field of Classification Search
USPC ............. 267/140.11, 140.12, 140.13, 140.14, 267/140.15, 141.2, 141.3; 248/562, 636, 248/638
See application file for complete search history.

(56) References Cited

U.S. PATENT DOCUMENTS

| | | | |
|---|---|---|---|
| 5,474,284 A * | 12/1995 | Hamaekers et al. | 267/220 |
| 5,775,666 A | 7/1998 | Tsukamoto et al. | |
| 6,375,173 B1 | 4/2002 | Takashima et al. | |
| 6,808,167 B2 * | 10/2004 | Kodama | 267/140.13 |
| 7,044,455 B2 | 5/2006 | Yoshida et al. | |
| 7,140,603 B2 | 11/2006 | Maeno et al. | |
| 7,322,570 B2 | 1/2008 | Maeno et al. | |
| 7,637,486 B2 * | 12/2009 | Goudie | 267/140.13 |
| 2006/0043658 A1 | 3/2006 | Tanaka et al. | |
| 2007/0222128 A1* | 9/2007 | Ichikawa et al. | 267/140.14 |

FOREIGN PATENT DOCUMENTS

| | | |
|---|---|---|
| JP | 4-39446 | 4/1992 |
| JP | 3846328 | 11/2006 |
| JP | 4135915 | 8/2008 |
| JP | 4228219 | 2/2009 |

* cited by examiner

*Primary Examiner* — Melody Burch
(74) *Attorney, Agent, or Firm* — Greenblum & Bernstein P.L.C.

(57) ABSTRACT

A vibration damping device including a main rubber elastic body elastically connecting a second mounting member and a first mounting member being arranged on axially one side of the second mounting member and a cylindrical outer bracket fit onto the second mounting member. A stopper portion integrally formed with the outer bracket extends radially inwardly to provide a first pressure receiving portion. A bound stopper member that restricts mutually approaching displacement of the two mounting members in the axial direction is constituted by including the first pressure receiving portion. A cylindrical second pressure receiving portion in a dual structure is formed by having the first pressure receiving portion extend axially inwardly and then folded axially outwardly. An axis perpendicular stopper member that restricts relative displacement of the two mounting members in the axis perpendicular direction is constituted by including the second pressure receiving portion.

5 Claims, 4 Drawing Sheets

VIBRATION DAMPING DEVICE

TECHNICAL FIELD

The present invention relates to a vibration damping device to be used, for example, for engine mount, body mount and member mount and the like of motor vehicles, especially a vibration damping device provided with a stopper member and attaching brackets.

BACKGROUND ART

Vibration damping devices have conventionally been known as a kind of vibration damping connecting components or vibration damping supports interposed between members that compose the vibration transmission system. Their application to engine mounts of motor vehicles, for example, has been studied. This type of vibration damping device comprises: a first mounting member to be attached to one component that configures the vibration transmission system; a second mounting member to be attached to the other component that configures the vibration transmission system; and a main rubber elastic body elastically connecting the first and second mounting members.

Meanwhile, a vibration damping device generally has a structure wherein an outer bracket is installed to the second mounting member for the purpose of improving the assembly workability and corresponding to different attaching structures and the like so as to attach the second mounting member to the connecting object such as auto bodies using said outer brackets.

Also, in some vibration damping devices, a stopper member can be installed in order to restrict the amount of deformation of the main rubber elastic body or to restrict the relative displacement of the connecting object at the time of overweight input. As a stopper member, a bound stopper member that restricts the displacement of the first and second mounting members getting closer to each other in the axial direction or an axis-perpendicular stopper member that restricts the relative displacement of the first and second mounting members in the axis-perpendicular direction is usually adopted.

Now, Japanese Patent No. 3846328 (Patent Document 1) shows a structure provided with a stopper portion and a metal stopper for composing a stopper member on the outer bracket. In other words, a step portion that expands in the axis-perpendicular direction is provided on the outer bracket (cylindrical bracket 112 in NO. 3846328), and the upper side of this step portion is made to be a smaller-diameter stopper portion that is located upward off the position of the second mounting member to face the first mounting member in the axis-perpendicular direction. In addition, the step portion is overlapped with a separate metal stopper that extends a given distance in the peripheral direction with a cross section of C-shape, which is fixed to the step portion and the stopper portion. Then, the bound stopper member is devised by having the top surface of the metal stopper abutted against the connecting object on the side of the first mounting member via a dustproof cover, while an axis-perpendicular stopper member is devised by abutting the inner periphery of the stopper portion against the outer periphery of the first mounting member via the dustproof cover.

However, since such a structure described in Patent Document 1 requires a separate metal stopper to be fixed to the outer bracket by welding and the like later, which increases the number of parts and production processes, a simpler structure with less number of parts has been sought.

Meanwhile, the inventors of the present invention have proposed to devise the bound stopper member by bending the upper end portion of the stopper portion toward the outer periphery to extend out, without providing a metal stopper. However, in an attempt to implement such a structure with an outer bracket formed by press work, one finds it difficult to maintain enough strength due to the thin thickness of the portion extended toward the outer periphery. On the other hand, when one tries to keep enough thickness at the portion extended toward the outer periphery, it was found barely realistic in terms that other portions of the outer bracket get thicker than necessary, resulting in a substantial weight increase.

BACKGROUND ART DOCUMENTS

Patent Documents

[Patent Document 1] Japanese Patent No. 3846328

Problems the Invention Attempts to Solve

The present invention has been developed in view of the circumstances described above as the background, and it is one object of the present invention to provide a vibration damping device of novel structure provided with both a stopper member that exerts effective stopper actions through its superior load-bearing capacity and an outer bracket for attaching purposes within a simple and light-weight structure with less number of parts.

Means for Solving the Problem

That is, a first mode of the present invention provides a vibration damping device including: a first mounting member; a second mounting member having a cylinder portion; a main rubber elastic body elastically connecting the second mounting member and the first mounting member being arranged on one side in an axial direction of the cylinder portion of the second mounting member; and a cylindrical outer bracket fit onto the cylinder portion of the second mounting member, the vibration damping device being characterized in that: an annular stopper portion is integrally formed with the outer bracket around the first mounting member by having one axial end portion of the outer bracket extend axially outwardly beyond the second mounting member; a first pressure receiving portion is formed by having one axial end portion of the stopper portion extend radially inwardly; a bound stopper member that restricts mutually approaching displacement of the first and second mounting members in the axial direction, is constituted by including the first pressure receiving portion; a second pressure receiving portion in a cylindrical form in a dual structure is formed by having a radially inner end portion of the first pressure receiving portion extend axially inwardly and then folded axially outwardly; and an axis-perpendicular stopper member that restricts relative displacement of the first and second mounting members in the axis-perpendicular direction, is constituted by including the second pressure receiving portion.

According to the vibration damping device in a structure following the above first mode, the stopper portion comprising the bound stopper member and the axis-perpendicular stopper member is integrally formed with the outer bracket. Therefore, there is no need for adding special parts in order to provide the bound stopper member and axis-perpendicular stopper member, which makes it possible to materialize a vibration damping device provided with those stopper members in a simple structure with less number of parts.

Moreover, the second pressure receiving portion comprising the axis-perpendicular stopper member is made in a dual structure by getting folded outward in the axial direction. That is, the second pressure receiving portion is prevented from being thinned out, which is a problem likely to be caused by integrally forming the stopper portion with the outer bracket, thus ensuring enough strength of the second pressure receiving portion. Therefore, the superior load-bearing capacity against the stopper load is achieved to prevent the stopper portion from being damaged by the input of the stopper load and to effectively obtain desired stopper actions.

In addition, given that the second pressure receiving portion is folded outward in the axial direction at its inner end portion in the axial direction, the inner end surface of the second pressure receiving portion consists of a curved surface. Therefore, it is possible to prevent the main rubber elastic body from being damaged with cracks and the like even if the main rubber elastic body undergoes significant elastic deformation by an input of a heavy load and comes into contact against the inner end surface of the second pressure receiving portion. This makes it possible to achieve superior durability.

A second mode of the present invention provides the vibration damping device according to the first mode, wherein the first pressure receiving portion is continuously provided around an entire circumference to make an annular form.

According to the second mode, the fabrication of the stopper portion at the outer bracket becomes easier by having the first pressure receiving portion in an annular form. In addition, since the stopper portion can be fabricated with a constant cross section all the way around, positioning of the outer bracket relative to the second mounting member in the circumferential direction can be made dispensable.

A third mode of the present invention provides the vibration damping device according to the first or second mode, wherein the outer bracket is provided with a step portion in an annular form, and the stopper portion protrudes out toward one side in the axial direction, from a radially inner end portion of the step portion, whereas a fitting portion that is fitted onto the cylinder portion of the second mounting member protrudes out from a radially outer end portion of the step portion toward another side in the axial direction, and wherein a positioning mechanism whereby the second mounting member and the outer bracket are positioned in the axial direction, is provided by abutting the second mounting member against the step portion.

According to the third mode, as the outer bracket is positioned in the axial direction relative to the second mounting member by the positioning mechanism, attaching of the outer bracket to the second mounting member can easily be performed. Moreover, positioning of the outer bracket in the axial direction relative to the second mounting member makes it possible to stabilize the stopper clearance of the bound stopper member and set it to high precision, while the abutting position of the second pressure receiving portion relative to the first mounting member can be determined with high precision in the axis-perpendicular stopper member, which ensures enough pressure receiving area more stably.

A fourth mode of the present invention provides the vibration damping device according to any one of the first through third modes, wherein an end portion of a part folded axially outwardly of the second pressure receiving portion is positioned axially inwardly from an axially outer surface of the first pressure receiving portion.

According to the fourth mode, the abutment of the first pressure receiving portion against the members on the side of the first mounting member is not obstructed by the end portion of the part folded axially outwardly of the second pressure receiving portion, thus exerting desired stopper action in a stable manner. Moreover, the axially outer end portion of the second pressure receiving portion is prevented from suffering damages caused by the stopper load, thus ensuring durability.

A fifth mode of the present invention provides the vibration damping device according to any one of the first through fourth modes, wherein a cushion rubber is provided in order to cover an axially outer side of the first pressure receiving portion while being interposed between opposing surfaces of the first mounting member and the second pressure receiving portion.

According to the fifth mode, in the bound stopper member and the axis-perpendicular stopper member, an impact mitigation action by the cushion rubber is exerted when the first and second pressure receiving portions are abutted against the members on the side of the first mounting member, thus reducing or muting the abutting noise.

Effect of the Invention

According to the present invention, it is possible to achieve a vibration damping device provided with stopper member in the bound direction and axis-perpendicular direction in a simple structure with less number of parts, since a stopper portion is integrally formed with an outer bracket installed for the purpose of corresponding to different attaching structures and so forth. In addition, thinning of the end side of the stopper portion, which is a problem likely to be caused when it is integrally provided with the outer bracket, is prevented by having the second pressure receiving portion comprising the end portion folded outward after extending inward in the axial direction to configure a dual structure, thus ensuring enough load-bearing capacity.

EMBODIMENTS FOR CARRYING OUT THE INVENTION

Figure 1:
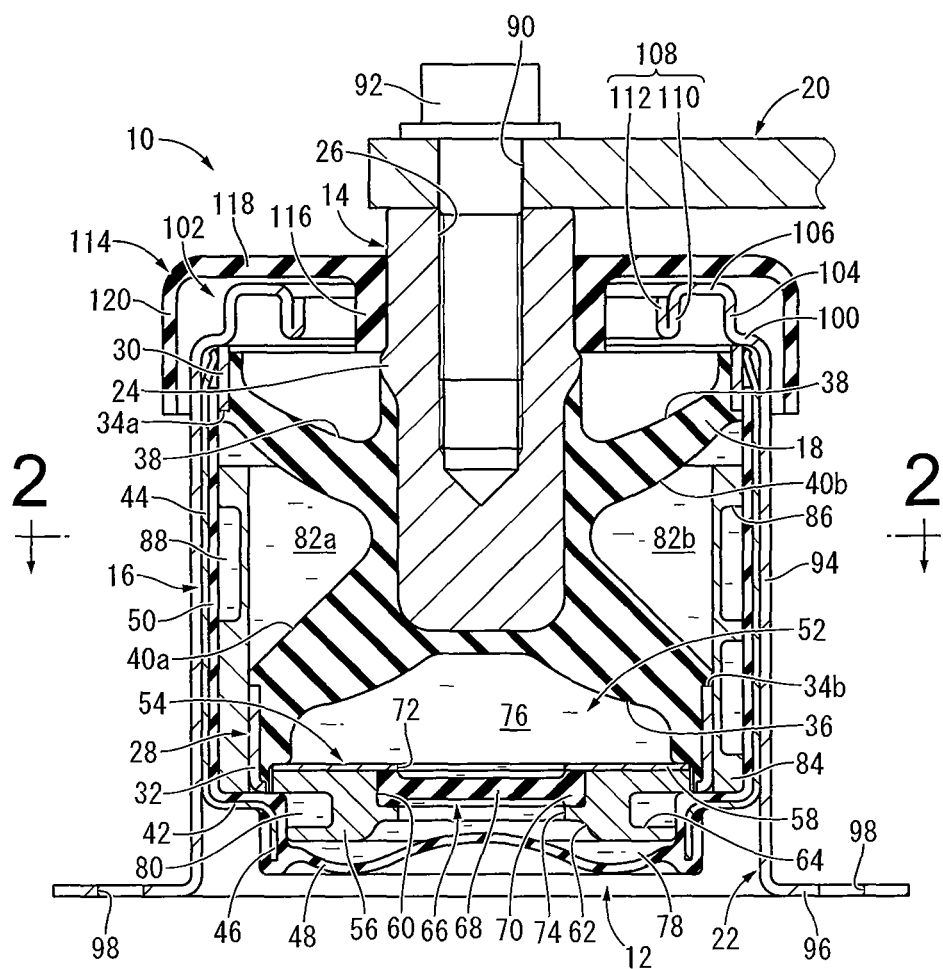
FIG. 1 is a longitudinal sectional view showing an engine mount mounted on a vehicle as one embodiment of the present invention, taken along line 1-1 of FIG. 2.

There will be described one embodiment of the present invention, while referring to the drawings.

Figure 2:
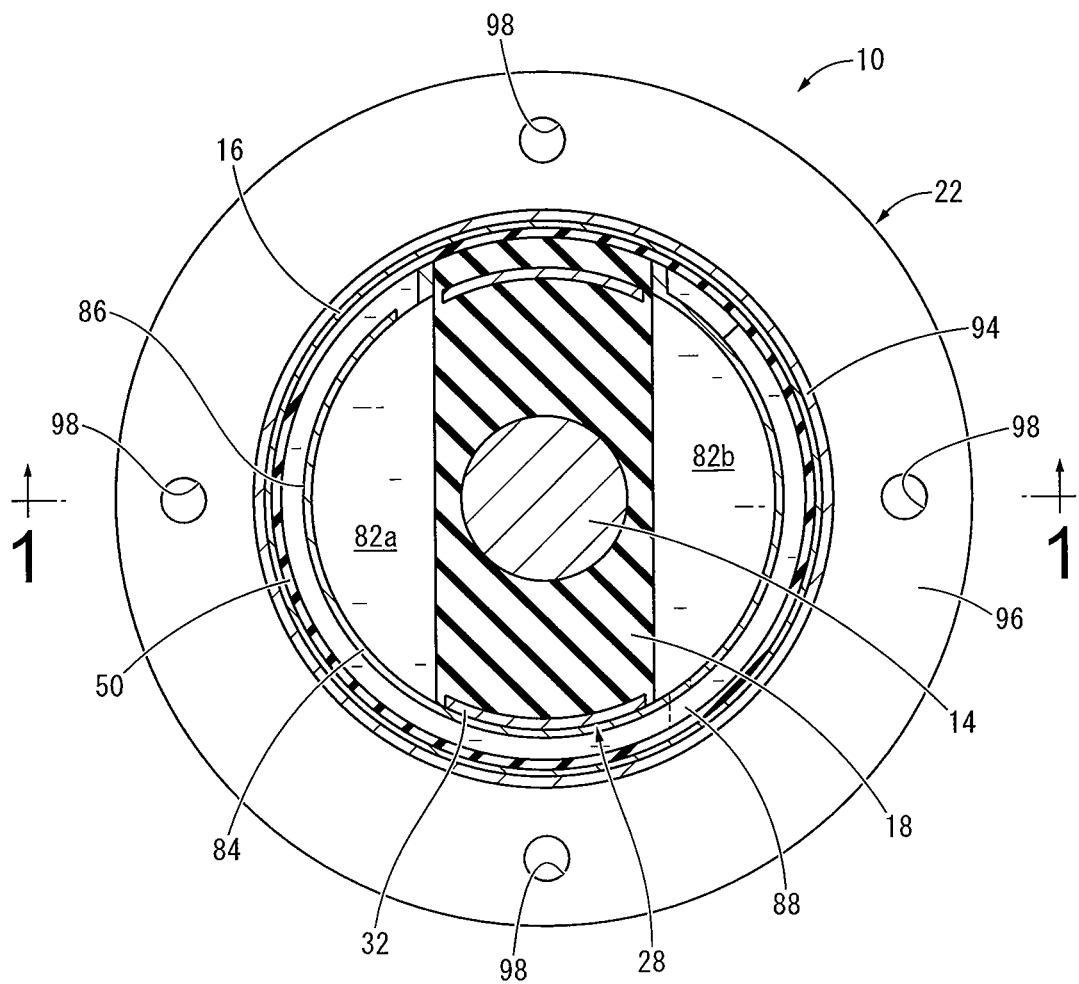
FIG. 2 is a cross sectional view taken along line 2-2 of FIG. 1.

FIGS. 1 and 2 show an engine mount 10 for motor vehicles as one embodiment of the vibration damping device having a structure according to the present invention. The engine mount 10 comprises a mount main body 12, which has a structure wherein a first mounting member 14 and a second mounting member 16 are elastically connected by a main rubber elastic body 18. Then, the first mounting member 14 is attached to a power unit, not shown in the figure, via an inner bracket 20, while the second mounting member 16 is attached to the vehicle body, not shown in the figure, via an outer bracket 22, so that the power unit and the vehicle body are connected in a vibration damping manner. In the following descriptions, the up-down direction generally means that of FIG. 1.

More specifically, the first mounting member 14 is a high-rigidity member formed with a metal material such as steel and aluminum alloy and is in an approximate form of a small-diameter cylinder. In addition, an annular protrusion 24 that protrudes out along the outer periphery is provided in the middle, in the axial direction, of the first mounting member 14. The diameter of the upper portion of the annular protrusion 24 is made larger than that of the lower portion thereof. Furthermore, in the first mounting member 14, a bolt hole 26 is formed that extends in the up-down direction on the center axis of the first mounting member 14 and opens up on the top surface, and a screw thread is provided on an inner circumferential surface of the bolt hole 26.

Also, about the first mounting member 14, an intermediate sleeve 28 is disposed outward with a given distance in the radial direction. The intermediate sleeve 28 is a high-rigidity member made of a metal material as the first mounting member 14 in an approximate form of a thin, large-diameter cylinder. In addition, a step portion, not shown in the figure, is provided on the intermediate sleeve 28 in around the midpoint in the axial direction, and an upper ring 30 on the upper side of the step portion has a larger diameter than a lower ring 32 below. Furthermore, in the middle of the intermediate sleeve 28 in the axial direction, a pair of windows 34a and 34b are formed facing each other in one radial direction. These windows 34 are through-holes that extend a given distance in the peripheral direction and are formed straddling over the upper ring 30 and the lower ring 32 in the axial direction.

Then, the first mounting member 14 is inserted into from the upper-side opening of the intermediate sleeve 28 in a co-axial manner. The first mounting member 14 and the intermediate sleeve 28 are elastically connected to each other by the main rubber elastic body 18. The main rubber elastic body 18 is in an approximate form of a thick, large-diameter cylinder, and the first mounting member 14 is inserted into its center portion in the radial direction and bonded thereto by vulcanization adhesion, while the intermediate sleeve 28 is overlapped and bonded by vulcanization adhesion on the outer periphery. In summary, the main rubber elastic body 18 is formed as an integral vulcanized molding product comprising the first mounting member 14 and the intermediate sleeve 28.

In addition, a large-diameter concavity 36 is formed in the main rubber elastic body 18. This large-diameter concavity 36 is in an approximate form of a reverse mortar, which is formed with a depth not reaching the bottom surface of the first mounting member 14. Also, the main rubber elastic body 18 is provided with void portions 38 and 38 that open upward. These void portions 38 are concavities that open up toward the top surface of the main rubber elastic body 18 and are formed to face each other in one radial direction, while increasing their depths toward the inner periphery due to their tapered bottom surfaces.

In addition, the main rubber elastic body 18 is provided with a pair of pocket portions 40a and 40b. These pocket portions 40 are concavities that open up along the outer periphery of the main rubber elastic body 18, which extends a distance less than half a round in the peripheral direction and opening up wider in the axial direction toward the opening side (outer periphery side). Then, the pair of pocket portions 40a and 40b formed to face each other in one radial direction in the integral vulcanized molding product of the main rubber elastic body 18 are opened up toward the outer periphery via the windows 34a and 34b formed in the intermediate sleeve 28.

The second mounting member 16 is attached to the integral vulcanized molding product of the main rubber elastic body 18. The second mounting member 16 is a high-rigidity member formed with a metal material and the like similar to that of the first mounting member 14 in an approximate form of a thin, large-diameter cylinder. Also, a supporting step portion 42 is provided in the middle, in the axial direction, of the second mounting member 16. The upper side of the supporting step portion 42 is made to be a large-diameter cylinder portion 44 as a cylinder portion, whereas the lower side thereof is made to be a small-diameter cylinder portion 46, thus forming the second mounting member 16 as a whole in an approximate form of a stepped cylinder.

In addition, a flexible membrane 48 is attached to the second mounting member 16. The flexible membrane 48 is a rubber membrane in an approximate form of a thin, large-diameter disk that has enough slack in the up-down direction. Then, the outer periphery edge of the flexible membrane 48 is bonded by vulcanization adhesion to the small-diameter cylinder portion 46 of the second mounting member 16, and the lower opening of the second mounting member 16 is closed in a fluid-tight way by the flexible membrane 48.

Furthermore, the inner peripheral surface of the second mounting member 16 is covered by a seal rubber layer 50. The seal rubber layer 50 is formed with a thin rubber elastic body and is integrally molded with the flexible membrane 48 in the present embodiment. Then, the seal rubber layer 50 is formed adhered to the top surface of the supporting step portion 42 and the inner peripheral surface of the large-diameter cylinder portion 44. Meanwhile, in the present embodiment, the seal rubber layer 50 is not provided at the upper end portion of the large-diameter cylinder portion 44 of the second mounting member 16, and the upper end portion of said second mounting member 16 is reduced in diameter upward.

Then, the second mounting member 16 is fitted onto the integral vulcanized molding product of the main rubber elastic body 18 by having the large-diameter cylinder portion 44 fitted onto the intermediate sleeve 28 and then reduced in diameter by a diameter reducing process such as all-round squeeze. Also, the intermediate sleeve 28 and the second mounting member 16 are positioned in the axial direction by overlapping the bottom surface of the intermediate sleeve 28 with the supporting step portion 42 of the second mounting member 16 via the seal rubber layer 50.

Thus, the opening of the large-diameter concavity 36 provided in the main rubber elastic body 18 is covered with the flexible membrane 48 by having the second mounting member 16 fitted onto the integral vulcanized molding product of the main rubber elastic body 18. This allows a fluid chamber 52 to be formed between the main rubber elastic body 18 and the opposing surface, in the axial direction, of the flexible membrane 48, in which non-compressible fluid is sealed in.

Meanwhile, the non-compressible fluid to be sealed within the fluid chamber 52 is not restricted to any particular substance, but water, alkylene glycol, polyalkylene glycol, silicone oil, or mixture of these and the like, for example, can favorably be adopted. In addition, in order to achieve the desired vibration damping effect based on the fluid flow behavior explained later, fluids with low viscosity at no more than 0.1 Pa·s are desirable.

A partition member 54 is contained and arranged in the fluid chamber 52. The partition member 54 is in an approximate form of a disk having a structure wherein a cover member 58 is overlapped with the top surface of a partition member main body 56 below.

More specifically, the partition member main body 56 is a hard member formed by a metal or a synthetic resin material and is in an approximate form of a thick disk. In addition, at the center, in the radial direction, of the partition member main body 56, a containing concavity 60 in a circular form in plan that opens toward the top surface is formed, and at the same time, a central concavity 62 in a circular form in plan that opens toward the bottom surface is formed. Furthermore, along the outer periphery edge of the partition member main body 56, a first peripheral groove 64 that opens toward the outer periphery is formed to extend a given length for less than one circumference in the peripheral direction.

The cover member 58 is made of a hard material similar to that of the partition member main body 56, and is in an approximate form of a thin disk. Then, the cover member 58 is overlapped with the top of the partition member main body 56. This allows the containing concavity 60 of the partition member main body 56 to be covered by the cover member 58 to form a containing void 66 between the partition member main body 56 and the cover member 58.

In this containing void 66, a movable membrane 68 is contained and arranged. The movable membrane 68 is made of a rubber elastic body in an approximate form of a disk, and an annular holding portion 70 is provided all around the outer periphery edge with increased thickness. Then, the movable membrane 68 is contained in the containing void 66, and the annular holding portion 70 is held between the partition member main body 56 and the cover member 58, and at the same time, the center portion is arranged in separation from the partition member main body 56 and the cover member 58 with some allowance for slight deformation in the up-down direction.

In addition, on the wall of the containing void 66, an upper through-hole 72 is formed through the cover member 58, and a lower through-hole 74 is formed through the partition member main body 56, which makes the area on the upper side of the movable membrane 68 open upward and the area on the lower side of the movable membrane 68 open downward.

The partition member 54 with such a structure mentioned above is contained in the fluid chamber 52 and supported its outer periphery edge by the second mounting member 16. Then, the fluid chamber 52 is divided into two sections with the partition member 54 in between by having the partition member 54 arranged so as to extend out in the axis-perpendicular direction within the fluid chamber 52. In other words, on the upper side of the partition member 54 is the main rubber elastic body 18 constituting part of the wall to form a pressure receiving chamber 76 that is subject to inner pressure fluctuations at the time of vibration input. On the other hand, the lower side of the partition member 54 is the flexible membrane 48 constituting part of the wall to form an equilibrium chamber 78 that easily allows volumetric fluctuations thereof due to deformation of the flexible membrane 48. Meanwhile, the pressure receiving chamber 76 and the equilibrium chamber 78 are filled and sealed with the above non-compressible fluid.

The opening of the first peripheral groove 64 is covered by the second mounting member 16 to form a flow channel in a form of a tunnel extending in the peripheral direction, and at the same time, the both ends in the peripheral direction of the tunnel-like fluid channel are communicated with each side of the pressure receiving chamber 76 and the equilibrium chamber 78. This forms a first orifice passage 80 that makes the pressure receiving chamber 76 and the equilibrium chamber 78 communicate with each other using the first peripheral groove 64. Meanwhile, the first orifice passage 80 is tuned up to a low frequency at around 10 Hz that is equivalent to the range of engine shake by means of adjusting the ratio of the cross-section area (A) to the length (L) of the channel (A/L) taking into account the wall spring rigidity of the pressure receiving chamber 76 and the equilibrium chamber 78.

The fluid pressure of the pressure receiving chamber 76 is exerted against the top surface of the movable membrane 68 via the upper through-hole 72, and at the same time, the fluid pressure of the equilibrium chamber 78 is exerted against the bottom surface of the movable membrane 68 via the lower through-hole 74, causing deformation of the movable membrane 68 based on the relative pressure fluctuations of the pressure receiving chamber 76 and the equilibrium chamber 78 at the time of vibration input. This allows the pressure receiving chamber 76 and the equilibrium chamber 78 to be substantially communicated with each other by slight deformation of the movable membrane 68 at the time of vibration input at a higher frequency than the tuning frequency of the first orifice passage 80 (for example, vibration equivalent to idling vibration or muffled sounds of a running vehicle), which results in the transmission of the fluid pressure between both chambers 76 and 78.

On the other hand, the openings of the pair of windows 34a and 34b are covered by the second mounting member 16 by having it fitted onto the integral vulcanized molding product of the main rubber elastic body 18, which forms a pair of axis-perpendicular fluid chambers 82a and 82b using the pair of pocket portions 40a and 40b. Meanwhile, non-compressible fluid similar to that in the fluid chamber 52 is filled and sealed in the pair of axis-perpendicular fluid chambers 82a and 82b.

Moreover, an orifice member 84 is arranged within the area between the opposing surfaces, in the radial direction, of the lower ring 32 of the intermediate sleeve 28 and the large-diameter cylinder portion 44 of the second mounting member 16. As shown in FIG. 2, the orifice member 84 is a member in an approximate form of C-shape in plan that extends a length less than one circumference in the peripheral direction so as to form a second peripheral groove 86 that opens toward the outer periphery. This second peripheral groove 86 is formed in vertical two rows, for example, and its upper row extends a length less than one circumference in the peripheral direction, while the lower row, after being folded at the end portion of the upper row in the peripheral direction, extends a length less than half the circumference in the peripheral direction which is shorter than the circumferential length of the opening of the axis-perpendicular fluid chamber 82a.

Then, the orifice member 84 is fitted onto the lower ring 32 of the intermediate sleeve 28 and is held between the second mounting member 16 and the intermediate sleeve 28 in the radial direction. In addition, the opening on the outer periphery side of the second peripheral groove 86 formed on the orifice member 84 is covered by the second mounting member 16 in a fluid-tight way to form a tunnel-like channel that extends in the peripheral direction. Both ends of this tunnel-like channel are communicated with each one of the pair of the axis-perpendicular fluid chambers 82a and 82b so as to form a second orifice passage 88 that makes the pair of axis-perpendicular fluid chambers 82a and 82b communicate with each other by the use of the second peripheral groove 86. Meanwhile, the tuning frequency of the second orifice passage 88 is set to approximately the same as that of the first orifice passage 80, but it can also be set to a different frequency from that of the first orifice passage 80 depending on the required characteristics.

The mount main body 12 in such a structure mentioned above is attached to a power unit, not shown in the figure, via the inner bracket 20, which can be installed to a vehicle by attaching itself to the vehicle body, not shown in the figure, via the outer bracket 22. The inner bracket 20 is a member in a form of a plate or a block that extends in one axis-perpendicular direction, and is fixed to the first mounting member 14 by overlapping with the upper surface thereof and by having a bolt 92 inserted through a bolt hole 90 and screwed into the bolt hole 26.

Figure 3:
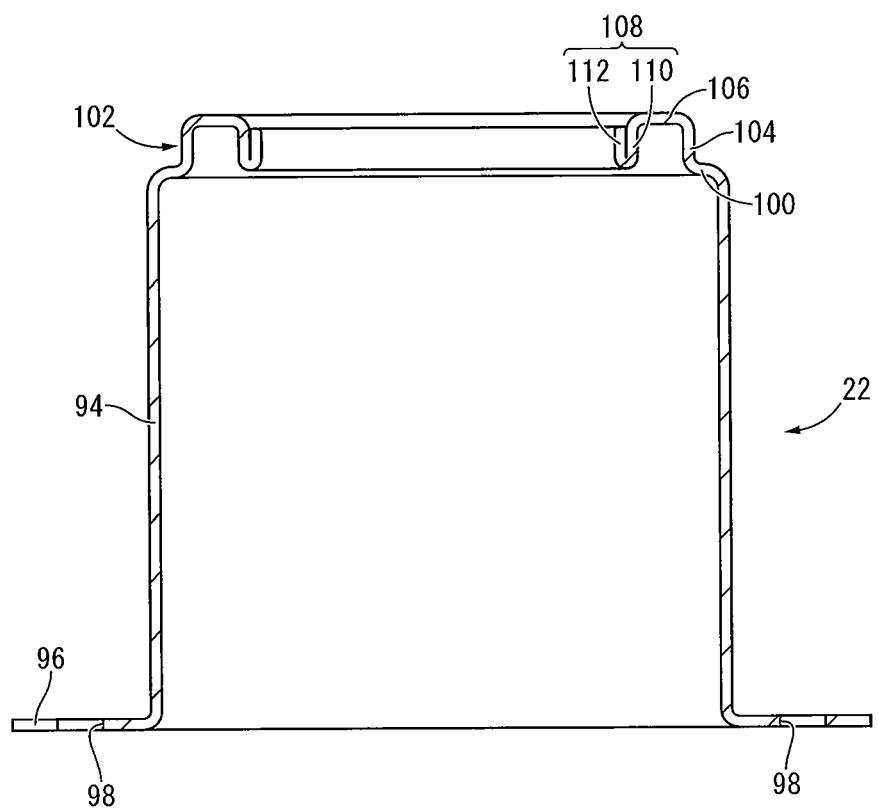
FIG. 3 is a longitudinal sectional view of an outer bracket of the engine mount shown in FIG. 1, taken along line 3-3 of FIG. 4.
Figure 4:
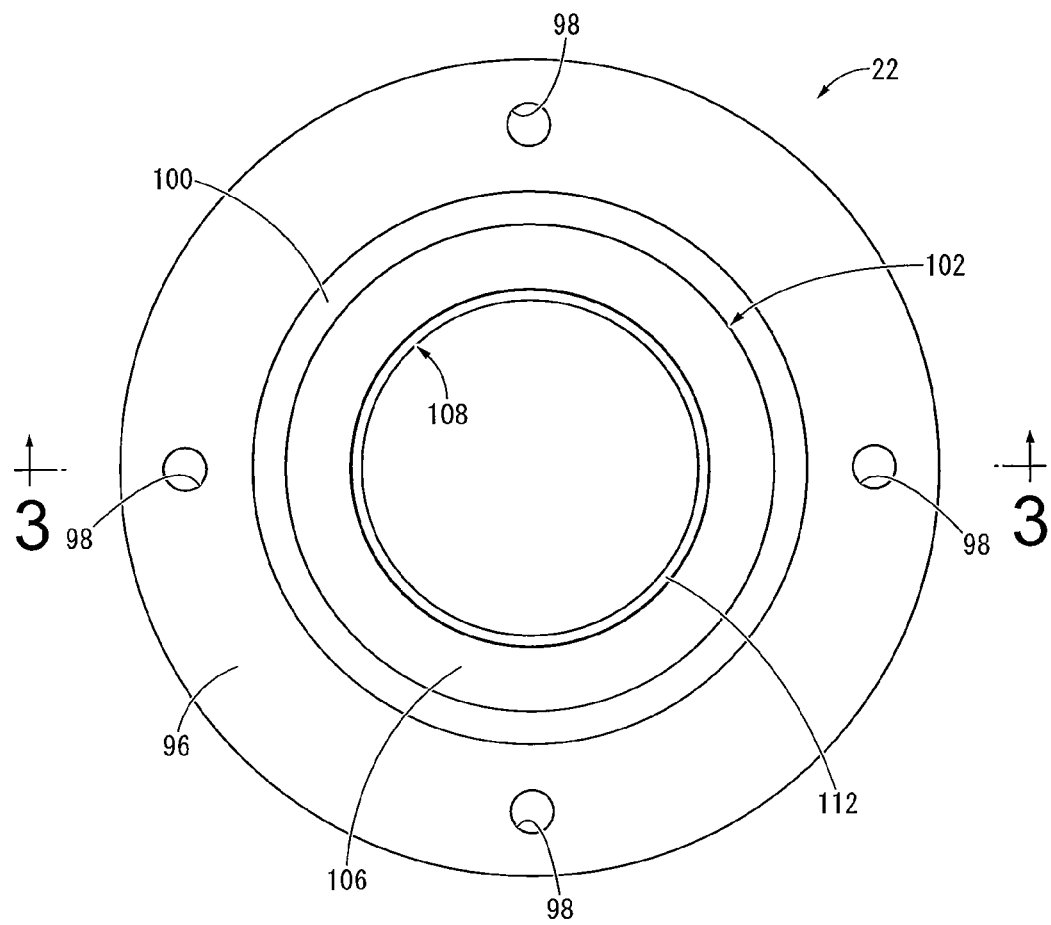
FIG. 4 is a plan view of the outer bracket shown in FIG. 3.

The outer bracket 22 is a high-rigidity member formed with a metal material and the like such as steel and aluminum alloy composed of a fitting portion 94 in an approximate form of a cylinder, as shown in FIGS. 3 and 4, wherein an attached piece 96 in a flange form is integrally formed protruding out toward the outer periphery from the bottom end of the fitting portion 94. Meanwhile, a plurality of bolt holes 98 are formed on the attached piece 96, and bolts, not shown in the figure, are inserted through these bolt holes 98 to fix the outer bracket 22 to the vehicle body. Also, at the upper end of the fitting portion 94, a step portion 100 in an annular form is integrally formed protruding radially inwardly so that the fitting portion 94 is made to protrude downward from the radially outer end portion of the step portion 100.

Then, the outer bracket 22 is attached to the second mounting member 16 by having the fitting portion 94 fitted onto (pressed in) the large-diameter cylinder portion 44 of the second mounting member 16 from above. Also, by abutting the step portion 100 against the upper surface of the intermediate sleeve 28, a positioning mechanism is configured for positioning the second mounting member 16 and the outer bracket 22 in the axial direction. Meanwhile, the positioning mechanism can be configured by abutting the step portion 100 directly against the upper surface of the second mounting member 16 without the intermediate sleeve 28 in between.

In this situation, a stopper portion 102 in an annular form is integrally provided on the outer bracket 22. The stopper portion 102 is integrally formed protruding upward from the radially inner end portion of the step portion 100 and is provided so as to surround the first mounting member 14 on the upper side of the intermediate sleeve 28 and the second mounting member 16. More specifically, the stopper portion 102 comprises a supporting portion 104 that protrudes upward from the step portion 100, a first pressure receiving portion 106 that extends radially inward from the upper end portion of the supporting portion 104, and a second pressure receiving portion 108 that extends downward (axially inwardly) from the radially inner end portion of the first pressure receiving portion 106 and is folded upward (axially outwardly) at the bottom end.

The supporting portion 104 is in an approximate form of a cylinder with a smaller diameter than that of the fitting portion 94, and its length in the axial direction is made shorter than that of the fitting portion 94. This supporting portion 104 protrudes upward from the radially inner end portion of the step portion 100 and is provided so as to surround the portion on the upper side of the annular protrusion 24 of the first mounting member 14.

The first pressure receiving portion 106 is in an approximate form of an annular disk and is made to be an inward flange that extends radially inwardly from the upper end portion of the supporting portion 104 all the way around. Meanwhile, in the present embodiment, the first pressure receiving portion 106 is continuously provided around an entire circumference. However, the supporting portion 104 that extends a length less than one circumference can be formed by means of partially increasing the protruding height of the supporting portion 104 along the periphery to form the first pressure receiving portion 106 with such increased protrusion height.

The second pressure receiving portion 108 is in an approximate form of a cylinder, comprising an outer peripheral plate 110 that extends downward from the radially inner end portion of the first pressure receiving portion 106 and an inner peripheral plate 112 that is folded upward from the bottom end of the outer peripheral plate 110. The outer peripheral plate 110 and the inner peripheral plate 112 are folded at the bottom end and overlapped with each other in the radial direction to form a dual structure, while the bottom surfaces of the outer peripheral plate 110 and the inner peripheral plate 112 are in an approximate cross-sectional form of a semi-circle. Also, the inner peripheral plate 112 that extends upward has its extended end portion (upper end) located on the lower side of the first pressure receiving portion 106 without reaching the upper surface thereof.

The stopper portion 102 in such a structure mentioned above is provided so as to surround the portion on the upper side of the annular protrusion 24 of the first mounting member 14 at a given distance in the radial direction. This allows the first pressure receiving portion 106 to be arranged to face the bottom surface of the inner bracket 20 across a given distance in the axial direction, whereas the second pressure receiving portion 108 is arranged to face the outer periphery of the first mounting member 14 across a given distance in the radial direction.

Then, the bound stopper member that restricts the displacement of the first mounting member 14 and the second mounting member 16 mutually approaching in the axial direction is configured by the abutment of the first pressure receiving portion 106 against the inner bracket 20. Also, the axis-perpendicular stopper member that restricts the relative displacement of the first mounting member 14 and the second mounting member 16 in the axis-perpendicular direction is configured by the abutment of the second pressure receiving portion 108 against the first mounting member 14.

Meanwhile, on the upper side of the annular protrusion 24 of the first mounting member 14, a cushion rubber 114 is installed. This cushion rubber 114 integrally comprises a first buffer portion 116 externally fitted around the first mounting member 14, a second buffer portion 118 that extends toward the outer periphery from the upper end portion of the first buffer portion 116, and a protective cylinder portion 120 that extends downward from the radially outer end portion of the second buffer portion 118 to cover the outer periphery of the upper end portion of the outer bracket 22. Then, the first buffer portion 116 is arranged within the area between the opposing surfaces of the first mounting member 14 and the second pressure receiving portion 108 in the radial direction, whereas the second buffer portion 118 covers the top of the first pressure receiving portion 106 and is arranged within the area between the opposing surfaces of the inner bracket 20 and the first pressure receiving portion 106 in the axial direction.

The engine mount 10 with such a structure according to the present embodiment exerts the vibration damping effect (high attenuation effect) based on the fluid flow behavior through the first orifice passage 80 under a vehicle-mounted condition when vibration in the axial direction is inputted and if such an input is low-frequency, high-amplitude vibration. On the contrary, if the input is mid to high frequency, low amplitude vibration, a fluid pressure transmitting action is produced due to the slight deformation of the movable membrane 68 between the pressure receiving chamber 76 and the equilibrium chamber 78 to obtain the desired vibration damping effect (low spring constant effect).

Also, at the time of vibration input in the axis-perpendicular direction, which is the opposing direction of the pair of axis-perpendicular fluid chambers 82*a* and 82*b*, a fluid flow is produced via the second orifice passage 88 between the pair of axis-perpendicular fluid chambers 82*a* and 82*b* to effectively exert the vibration damping effect based on the fluid flow action.

In case of the engine mount 10, a stopper action is exerted that restricts the relative displacement of the first mounting member 14 and the second mounting member 16 at the time of a heavy load input.

In other words, the inner bracket 20 fixed to the first mounting member 14 is made to abut against the first pressure receiving portion 106 of the outer bracket 22 fixed to the second mounting member 16 when a heavy load is inputted in the axial direction and the first mounting member 14 is substantially displaced to get closer to the second mounting member 16 in the axial direction. This allows the relative displacement of the first mounting member 14 and the second mounting member 16 getting closer to each other in the axial direction to be restricted by the bound stopper member, thus preventing the power unit from contacting other members and also preventing the main rubber elastic body 18 from sustaining damages by excessive deformation.

Also, when a heavy load is inputted in the axis-perpendicular direction and the first mounting member 14 undergoes a substantial relative displacement in the axis-perpendicular direction relative to the second mounting member 16, the first mounting member 14 gets in contact with the second pressure receiving portion 108 of the outer bracket 22 fixed to the second mounting member 16. This allows the relative displacement of the first mounting member 14 and second mounting member 16 in the axis-perpendicular direction to be restricted by the axis-perpendicular stopper member, thus avoiding troubles such as damages caused by excessive relative displacement of the first and second mounting members 14 and 16.

Furthermore, between the first pressure receiving portion 106 and the inner bracket 20 in case of the bound stopper member as well as between the second pressure receiving portion 108 and the first mounting member 14 in case of the axis-perpendicular stopper member, a cushion rubber 114 is interposed respectively. Therefore, a hitting noise produced by the abutment of the first pressure receiving portion 106 against the inner bracket 20 or the abutment of the second pressure receiving portion 108 against the first mounting member 14 is either reduced or prevented by the energy attenuation caused by inner friction associated with the elastic deformation of the cushion rubber 114.

Such bound stopper member and axis-perpendicular stopper member are achieved by the stopper portion 102 integrally formed on the outer bracket 22, thus preventing an increase in the number of parts that could be caused by providing those stopper members.

In addition, the second pressure receiving portion 108 that tends to get thin due to the sheet metal expansion process is folded at the bottom end to form a dual structure having the outer peripheral plate 110 and the inner peripheral plate 112, thus securing enough thickness of the second pressure receiving portion 108 to obtain its high strength.

Moreover, since the dual structure of the second pressure receiving portion 108 is achieved by its folding at the bottom end, the bottom surface of the second pressure receiving portion 108 is made to be a curved surface in an approximate form of a semicircle in longitudinal section. Therefore, even if an input of a heavy load in the rebound direction causes significant deformation of the main rubber elastic body 18 so that the top surface of the main rubber elastic body 18 gets in contact with the bottom surface of the second pressure receiving portion 108, formation of cracks and the like in the main rubber elastic body 18 caused by such a contact can be avoided, which results in enhanced durability.

Also, since the upper end of the inner peripheral plate 112 is located lower than the upper surface of the first pressure receiving portion 106, the top surface of the inner peripheral plate 112 does not abut against the inner bracket 20 at the time of displacement of the first mounting member 14 and the second mounting member 16 getting closer to each other in the axial direction. Therefore, the stopper action by the abutment of the first pressure receiving portion 106 against the inner bracket 20 is effectively exerted while preventing the cushion rubber 114 from being damaged by contacting the end of the inner peripheral plate 112.

Also, in the present embodiment, the first pressure receiving portion 106 is continuously provided all the way around in an annular form, and the stopper portion 102 has approximately a constant cross section. Therefore, fabrication of the stopper portion 102 becomes easier at the time of manufacturing the outer bracket 22, while the relative direction of the outer bracket 22 and the mount main body 12 in the peripheral direction does not get restricted by the stopper member.

One embodiment of the present invention has been explained above, but the present invention is not restricted to the specific one described. For example, in the outer bracket 22, the step portion 100 provided between the fitting portion 94 and the stopper portion 102 can be dispensed with, or the supporting portion 104 can be provided directly on the upper side of the fitting portion 94.

Also, the structure wherein the outer bracket 22 is attached to the connecting object (vehicle body etc.) should not be construed restrictively as specific structure of the present embodiment described above, and various structures can be adopted depending on the structure of the connecting object.

In the embodiment described above, the cushion rubber 114 is formed with a separate rubber elastic body and fitted onto the first mounting member 14, but it can also be fixed, for example, to at least one of the opposing surfaces of the first pressure receiving portion 106 and the inner bracket 20, and at the same time fixed to at least one of the opposing surfaces of the second pressure receiving portion 108 and the first mounting member 14. In addition, the cushion rubber arranged between the opposing surfaces of the first pressure receiving portion 106 and the inner bracket 20 and the cushion rubber arranged between the opposing surfaces of the second pressure receiving portion 108 and the first mounting member 14 can either be provided integrally as in the embodiment described above, or provided separately as mutually independent ones.

Also, in the embodiment described above, a two-way attenuation mount that can exert the vibration damping effect based on the fluid flow action in response to two way vibration inputs in the axial and axis-perpendicular directions is exemplified, but the structure of the mount main body is not restricted to a particular one. More specifically, the present invention can be applied, for example, to a fluid-sealed vibration damping device that can exert the vibration damping effect based on the fluid flow action in response to a vibration input in the axial direction as shown in Japanese Patent No. 4228219, or to a vibration damping device that takes advantage of attenuation based on the inner friction and the like of the main rubber elastic body as shown in FIG. 1 of Japanese Patent No. 4135915, by means of fitting the outer bracket 22 onto the second mounting member.

The range of application of the vibration damping device related to the present invention is not restricted to the engine mount, but it can be applied to the body mount, member mount and differential mount and so forth. Also, the range of application of the present invention is not restricted to vibration damping devices for motor vehicles, but can be favorably applied to vibration damping devices used for motorcycles, rail cars, industrial vehicles and the like.

DESCRIPTION OF THE NUMERALS

10: Engine mount (vibration damping device)
14: First mounting member
16: Second mounting member
18: Main rubber elastic body
22: Outer bracket
44: Large-diameter cylinder portion (cylinder portion)
94: Fitting portion
100: Step portion
102: Stopper portion
106: First pressure receiving portion
108: Second pressure receiving portion
114: Cushion rubber

The invention claimed is:

1. A vibration damping device, comprising:
a first mounting member;
a second mounting member having a cylinder portion;
a main rubber elastic body elastically connecting the second mounting member and the first mounting member being arranged on one side in an axial direction of the cylinder portion of the second mounting member;
a cylindrical outer bracket fit onto the cylinder portion of the second mounting member; and
an annular stopper portion formed out of a portion of the outer bracket such that the annular stopper portion is an integral piece of the outer bracket, the annular stopper portion extending around the first mounting member and being defined by a first portion of the stopper portion that extends axially outwardly beyond the second mounting member,
a second portion of the stopper portion extending radially inwardly to define a first pressure receiving portion,
a bound stopper member that restricts mutually approaching displacement of the first and second mounting members in the axial direction, which is provided by the first pressure receiving portion,
a second pressure receiving portion in a cylindrical form defined by a dual structure formed having a radially inner end portion of the first pressure receiving portion extend axially inwardly to form an outer peripheral plate and then folded axially outwardly to form an inner peripheral plate, the outer peripheral plate and the inner peripheral plate extending parallel to each other in the axial direction; and
an axis-perpendicular stopper member that restricts relative displacement of the first and second mounting members in the axis-perpendicular direction, which is provided by the second pressure receiving portion.

2. The vibration damping device according to claim 1, wherein the first pressure receiving portion is continuously provided around an entire circumference to make an annular form.

3. The vibration damping device according to claim 1, wherein the outer bracket is provided with a step portion in an annular form, and the stopper portion protrudes out toward one side in the axial direction, from a radially inner end portion of the step portion, whereas a fitting portion that is fitted onto the cylinder portion of the second mounting member protrudes out from a radially outer end portion of the step portion toward another side in the axial direction, and wherein a positioning mechanism whereby the second mounting member and the outer bracket are positioned in the axial direction, is provided by abutting the second mounting member against the step portion.

4. The vibration damping device according to claim 1, wherein an end portion of a part folded axially outwardly of the second pressure receiving portion is positioned axially inwardly from an axially outer surface of the first pressure receiving portion.

5. The vibration damping device according to claim 1, further comprising a cushion rubber provided in order to cover an axially outer side of the first pressure receiving portion while being interposed between opposing surfaces of the first mounting member and the second pressure receiving portion.

* * * * *